(12) United States Patent
Choi

(10) Patent No.: US 11,577,585 B2
(45) Date of Patent: Feb. 14, 2023

(54) DOOR FRAME FOR VEHICLE

(71) Applicants: Hyundai Motor Company, Seoul (KR); Kia Motors Corporation, Seoul (KR)

(72) Inventor: Je Won Choi, Anyang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 488 days.

(21) Appl. No.: 16/790,951

(22) Filed: Feb. 14, 2020

(65) Prior Publication Data
US 2021/0122215 A1  Apr. 29, 2021

(30) Foreign Application Priority Data
Oct. 24, 2019  (KR) .................. 10-2019-0133084

(51) Int. Cl.
*B60J 5/04* (2006.01)
*B60J 10/76* (2016.01)
*B60J 10/80* (2016.01)

(52) U.S. Cl.
CPC .......... *B60J 5/0405* (2013.01); *B60J 5/0402* (2013.01); *B60J 5/0413* (2013.01); *B60J 10/76* (2016.02); *B60J 10/80* (2016.02)

(58) Field of Classification Search
CPC ........ B60J 5/0405; B60J 5/0402; B60J 10/76; B60J 10/80; B60J 10/86; B60J 10/87

USPC ...................................................... 296/146.5
See application file for complete search history.

(56) References Cited

U.S. PATENT DOCUMENTS

| | | | |
|---|---|---|---|
| 9,186,964 B2* | 11/2015 | Im | B60J 5/0405 |
| 2014/0096452 A1* | 4/2014 | Inaba | B60J 5/0402 |
| | | | 49/501 |
| 2018/0178640 A1* | 6/2018 | Nagai | B60J 10/242 |
| 2018/0208037 A1* | 7/2018 | Okazaki | B60J 10/86 |
| 2019/0152307 A1* | 5/2019 | Choi | B60J 10/87 |
| 2019/0315215 A1* | 10/2019 | Su | B60J 10/88 |
| 2022/0161643 A1* | 5/2022 | Lehmann | B29C 48/09 |
| 2022/0297519 A1* | 9/2022 | Hamada | B60J 10/87 |

FOREIGN PATENT DOCUMENTS

CN    108116202 B  *  9/2022  ............. B60J 10/76

* cited by examiner

*Primary Examiner* — Hilary L Gutman
(74) *Attorney, Agent, or Firm* — Slater Matsil, LLP

(57) ABSTRACT

A door frame for a vehicle includes an inboard panel that includes an outer peripheral wall, an inner peripheral wall spaced apart from the outer peripheral wall, and an inboard side wall connecting the outer peripheral wall and the inner peripheral wall. The outer peripheral wall extends obliquely from the inboard side wall at a predetermined angle. The doorframe also includes an outboard panel coupled to the inboard panel. The outer peripheral wall has a mounting hole for mounting a door weatherstrip.

8 Claims, 5 Drawing Sheets

DOOR FRAME FOR VEHICLE

CROSS-REFERENCE TO RELATED APPLICATIONS

This application claims priority to Korean Patent Application No. 10-2019-0133084, filed in the Korean Intellectual Property Office on Oct. 24, 2019, which application is hereby incorporated herein by reference.

TECHNICAL FIELD

The present disclosure relates to a door frame for a vehicle.

BACKGROUND

A vehicle has doors including a door panel and a door frame connected to the door panel. The door frame defines a window opening which is opened and closed by a window glass. A glass run provides a seal between the door frame and the window glass, and a weatherstrip provides a seal between the door frame and a vehicle body.

The weatherstrip includes a door weatherstrip mounted on the outer periphery of the door frame, and a body weatherstrip attached to the periphery of a door opening of the vehicle body where the door is opened and closed. When the vehicle door closes the door opening of the vehicle body, the door weatherstrip may tightly contact the vehicle body to provide a seal between the vehicle body and the door frame, and the body weatherstrip may tightly contact the door frame to provide a seal between the door frame and the vehicle body.

The door frame includes an outboard panel facing an exterior space of the vehicle, and an inboard panel facing an interior space of the vehicle. The inboard panel of the door frame has a plurality of mounting holes formed in edges thereof, and fasteners for mounting the door weatherstrip are fastened to the mounting holes, respectively.

According to the related art, after the inboard panel is manufactured by a press die, the mounting holes are machined by laser piercing. In particular, as the inboard panel of the door frame has an interior space of a narrow U-shaped cross-section, a cam piercing method using the press die cannot be applied. Accordingly, a laser piercing apparatus is required to pierce the mounting holes in the inboard panel made by the press die, leading to excessive equipment investment (e.g., about 3 billion KRW or $2.6M). In addition, the inboard panel needs to be transported to the laser piercing apparatus, requiring additional man-hours. Furthermore, when the inboard panel is mounted on a jig of the laser piercing apparatus, the mounting hole is newly positioned in accordance with a tooling hole of the jig, causing severe quality variation of the mounting holes, which often results in faulty position of the mounting holes.

The above information described in this background section is provided to assist in understanding the background of the inventive concept, and may include any technical concept which is not considered as the prior art that is already known to those skilled in the art.

SUMMARY

The present disclosure relates to a door frame for a vehicle. Particular embodiments relate to a door frame for a vehicle allowing precise and easy machining of mounting holes for a door weatherstrip.

Embodiments of the invention can solve above-mentioned problems occurring in the prior art while advantages achieved by the prior art are maintained intact.

An aspect of the present disclosure provides a door frame for a vehicle, allowing precise and easy machining of mounting holes for a door weatherstrip with relatively low cost.

According to an aspect of the present disclosure, a door frame for a vehicle may include an inboard panel including an outer peripheral wall, an inner peripheral wall spaced apart from the outer peripheral wall, and an inboard side wall connecting the outer peripheral wall and the inner peripheral wall. An outboard panel is coupled to the inboard panel. The outer peripheral wall may have a mounting hole for mounting a door weatherstrip and the outer peripheral wall may extend obliquely at a predetermined angle.

The outer peripheral wall may be inclined with respect to the inboard side wall at a first inclined angle, and the first inclined angle may be acute.

The inner peripheral wall may be inclined with respect to the inboard side wall at a second inclined angle, and the second inclined angle may be acute.

The inboard panel may have a first flange extending from the outer peripheral wall, and a second flange extending from the inner peripheral wall, and the outboard panel may have a third flange coupled to the first flange, and a fourth flange coupled to the second flange.

The inboard panel may include a connecting wall connecting between the outer peripheral wall and the first flange, and at least one support shoulder provided on the connecting wall.

The support shoulder may support an exterior component loaded when a vehicle body is assembled.

The support shoulder may be recessed from the connecting wall toward the inner peripheral wall.

An extension line virtually extending from an edge of the mounting hole to be parallel to an axis of the mounting hole may not interfere with an end of the second flange of the inboard panel.

The inboard panel may be integrally connected to a door panel of a vehicle door so that the inboard panel and the door panel may form a unitary one-piece structure.

The door weatherstrip may continuously extend along the outer peripheral wall of the inboard panel and edges of the door panel.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
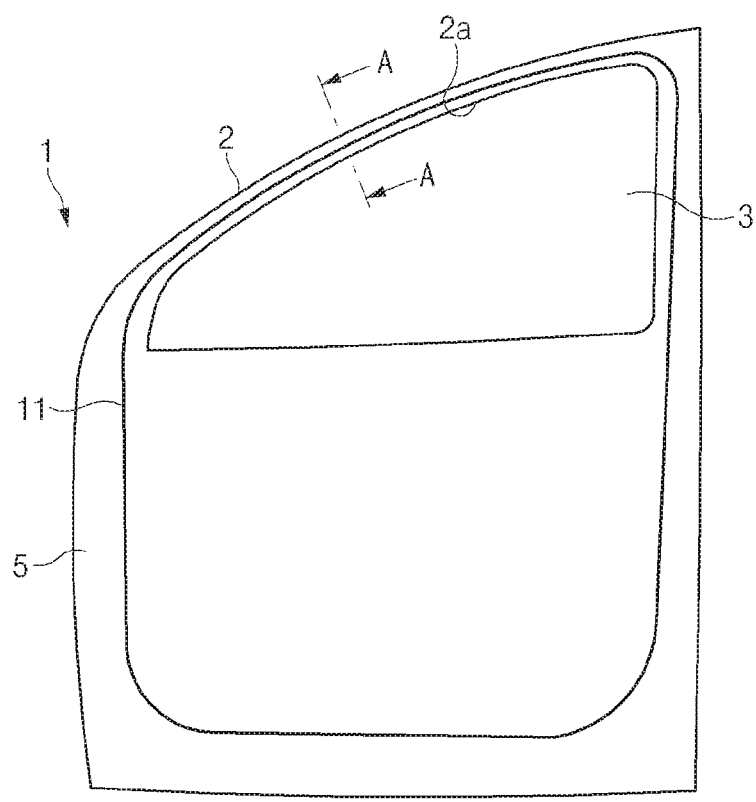
FIG. 1 illustrates the inboard side of a vehicle door.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

In this description, the term "inner" refers to a direction toward the center of a window opening of a door frame, and the term "outer" refers to a direction away from the center of the window opening of the door frame. In addition, the term "inboard side" refers to a direction toward an interior space of a vehicle, and the term "outboard side" refers to a direction toward an exterior space of the vehicle.

FIG. 1 illustrates the inboard side of a vehicle door 1. Referring to FIG. 1, the vehicle door 1 may include a door panel 5 and a door frame 2. The door frame 2 may define a window opening 2a, and a window glass 3 may be fixedly or movably mounted in the window opening 2a of the door frame 2. A glass run 4 may be attached to the door frame 2, and the glass run 4 may provide a seal between the door frame 2 and the window glass 3.

Figure 2:
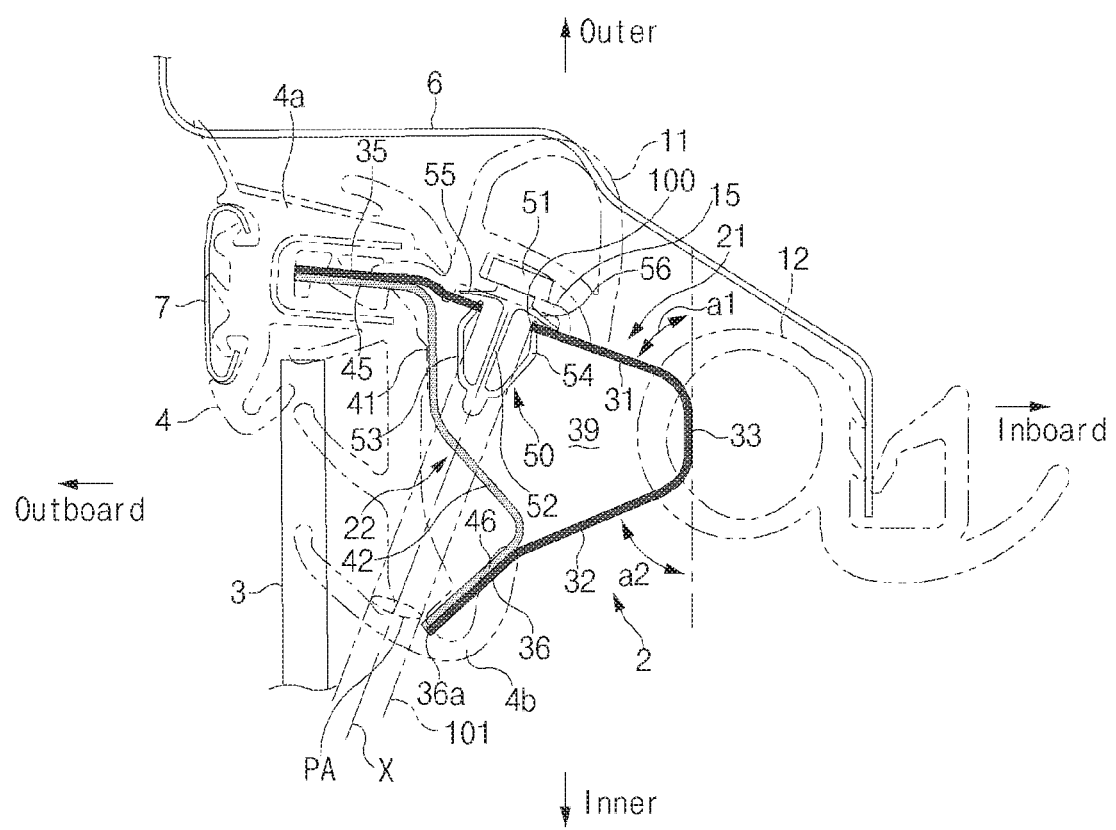
FIG. 2 illustrates a cross-sectional view, taken along line A-A of FIG. 1.

Referring to FIG. 2, the door frame 2 may include an inboard panel 21 facing the interior space of the vehicle, and an outboard panel 22 facing the exterior space of the vehicle.

The inboard panel 21 may include an outer peripheral wall 31, an inner peripheral wall 32 spaced apart from the outer peripheral wall 31, and an inboard side wall 33 connecting the outer peripheral wall 31 and the inner peripheral wall 32. The outer peripheral wall 31 may extend obliquely from the inboard side wall 33 at a predetermined angle, and the outer peripheral wall 31 may form the outer periphery of the door frame 2. The inner peripheral wall 32 may extend obliquely from the inboard side wall 33 at a predetermined angle, and the inner peripheral wall 32 may form the inner periphery of the door frame 2. The inboard side wall 33 may face the interior space of the vehicle. The outer peripheral wall 31 may be inclined with respect to the inboard side wall 33 at a first inclined angle a1, and the inner peripheral wall 32 may be inclined with respect to the inboard side wall 33 at a second inclined angle a2. The inboard side wall 33 may extend vertically. The first inclined angle a1 is an angle between an axis of the outer peripheral wall 31 and an axis of the inboard side wall 33, the second inclined angle a2 is an angle between an axis of the inner peripheral wall 32 and the axis of the inboard side wall 33.

According to an exemplary embodiment of the present disclosure, as the outer peripheral wall 31 of the inboard panel 21 is inclined at the first inclined angle a1, a mounting hole 100 may be easily machined in the outer peripheral wall 31 of the inboard panel 21 by cam piercing using a press die 200. In detail, as the outer peripheral wall 31 of the inboard panel 21 is inclined at the first inclined angle a1, a support bushing 205 of the press die 200 to be described below may be prevented from interfering with the inboard panel 21. Thus, unlike the related art, the machining of the mounting hole 100 may be performed by cam piercing using the press die 200 more precisely and easily.

In addition, the inboard panel 21 may have a V-shaped cross-section as the outer peripheral wall 31 and the inner peripheral wall 32 are inclined, which provides a space allowing the support bushing 205 of the press die 200 to be positioned in the inboard panel 21.

For example, each of the first inclined angle a1 and the second inclined angle a2 may be an acute angle less than 90°, and the first inclined angle a1 may be greater than or equal to the second inclined angle a2. The space between the outer peripheral wall 31 and the inner peripheral wall 32 of the inboard panel 21 may be relatively widened, so that the support bushing 205 of the press die 200 may be reliably prevented from interfering with the inboard panel 21.

The inboard panel 21 may have a first flange 35 located on the outer periphery of the inboard panel 21, and a second flange 36 located on the inner periphery of the inboard panel 21. The first flange 35 may extend horizontally from the outer peripheral wall 31, and the second flange 36 may extend obliquely from the inner peripheral wall 32 at a predetermined angle.

The outboard panel 22 may include a vertical wall 41, and an inclined wall 42 extending obliquely from the vertical wall 41. In addition, the outboard panel 22 may have a third flange 45 located on the outer periphery of the outboard panel 22, and a fourth flange 46 located on the inner periphery of the outboard panel 22. The third flange 45 may extend horizontally from the vertical wall 41, and the fourth flange 46 may extend obliquely from the inclined wall 42 at a predetermined angle.

The first flange 35 of the inboard panel 21 and the third flange 45 of the outboard panel 22 may be coupled by welding or the like, and the second flange 36 of the inboard panel 21 and the fourth flange 46 of the outboard panel 22 may be coupled by welding or the like.

The inboard panel 21 may have a cavity 39. As the flanges 45 and 46 of the outboard panel 22 are coupled to the flanges 35 and 36 of the inboard panel 21, respectively, the cavity 39 of the inboard panel 21 may be closed with respect to the outside. Thus, the door frame 2 may have a closed cross-sectional shape.

According to the exemplary embodiment illustrated in FIG. 1, as the door frame 2 is integrally connected to the door panel 5, the door frame 2 and the door panel 5 may form a unitary one-piece structure. Specifically, the inboard panel 21 of the door frame 2 may be integrally connected to the door panel 5, and a door weatherstrip 11 may continuously extend along the outer peripheral wall 31 of the inboard panel 21 of the door frame 2 and inboard side edges of the door panel 5. That is, the door weatherstrip 11 may form a continuous closed loop structure along the outer peripheral wall 31 of the inboard panel 21 of the door frame 2 and the inboard side edges of the door panel 5.

The glass run 4 may have a first joint portion 4a at which the first flange 35 and the third flange 45 of the door frame 2 are joined, and a second joint portion 4b at which the second flange 36 and the fourth flange 46 of the door frame 2 are joined.

The weatherstrips 11 and 12 may provide a seal between the door frame 2 and a vehicle body 6. The weatherstrips 11 and 12 may include the door weatherstrip 11 mounted in the inboard panel 21 of the door frame 2, and a body weatherstrip 12 mounted in a side outer of the vehicle body 6. When the vehicle door 1 closes a door opening of the vehicle body, the door weatherstrip 11 may tightly contact the vehicle body 6 to provide a seal between the door frame 2 and the vehicle body 6, and the body weatherstrip 12 may tightly contact the door frame 2 to provide a seal between the vehicle body 6 and the door frame 2.

The inboard panel 21 may have the plurality of mounting holes 100. As each fastener 50 is fastened to a mounting flange 15 of the door weatherstrip 11 and each mounting hole 100 of the inboard panel 21, the door weatherstrip 11 may be mounted to the inboard panel 21. An axis X of each mounting hole 100 may be orthogonal to the outer peripheral wall 31, and an axis of each fastener 50 may be aligned with the axis X of the mounting hole 100.

The fastener 50 may include a head portion 51, a post 52 extending from the head portion 51, a plurality of lower legs 53 and 54 extending obliquely from a bottom end of the post 52 toward the head portion 51, and a plurality of upper legs 55 and 56 extending from a bottom surface of the head portion 51 toward an outer diameter thereof. The lower legs 53 and 54 and the upper legs 55 and 56 may be elastically deformed. In a state in which the post 52 of the fastener 50 passes through the mounting flange 15 of the door weatherstrip 11 and the mounting hole 100, the lower legs 53 and 54 may press a bottom surface of the outer peripheral wall 31, and the upper legs 55 and 56 may press a top surface of the outer peripheral wall 31, so that the door weatherstrip 11 may be firmly mounted to the inboard panel 21 of the door frame 2.

Referring to FIG. 2, an extension line 101 virtually extending from an edge of the mounting hole 100 to be parallel to the axis X of the mounting hole 100 may not interfere with an end 36a of the second flange 36 of the inboard panel 21, and thus the mounting hole 100 may be easily and precisely machined in the outer peripheral wall 31 of the inboard panel 21 by a cam piercing process. In other words, a projected area PA of the mounting hole 100 which is projected toward the second flange 36 of the inboard panel 21 may not overlap the second flange 36 of the inboard panel 21.

Figure 3:
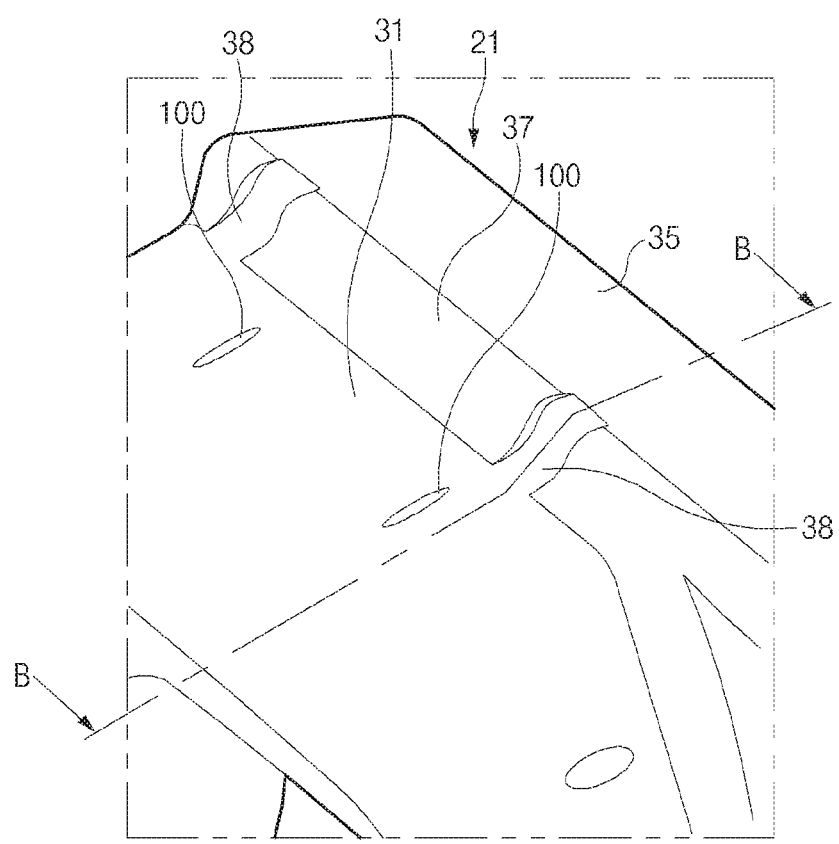
FIG. 3 illustrates a perspective view of a portion of a door frame for a vehicle according to an exemplary embodiment of the present disclosure.
Figure 4:
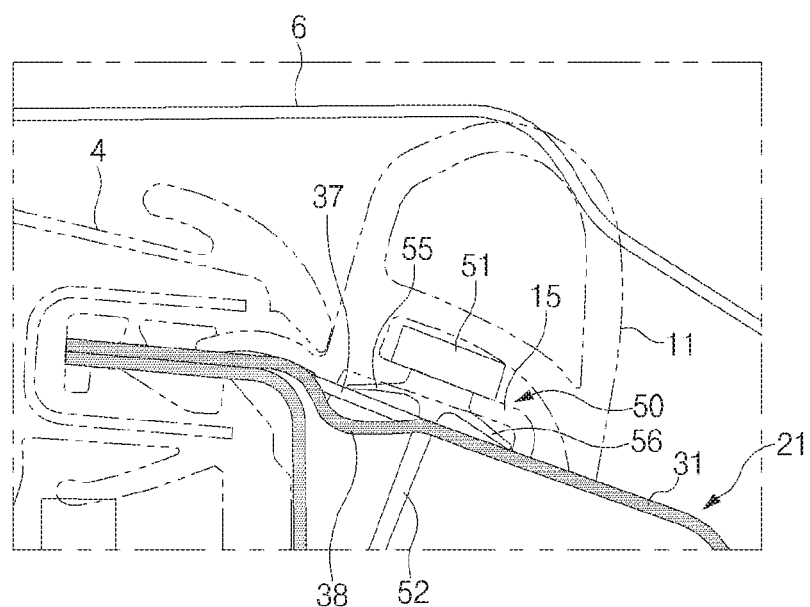
FIG. 4 illustrates a cross-sectional view, taken along line B-B of FIG. 3.

Referring to FIGS. 3 and 4, the inboard panel 21 may include a connecting wall 37 connecting between the outer peripheral wall 31 and the first flange 35, and at least one support shoulder 38 provided on the connecting wall 37. The connecting wall 37 may be rounded to a predetermined radius, and the support shoulder 38 may be formed on the connecting wall 37. The support shoulder 38 may temporarily support an exterior component such as a roof frame loaded when the vehicle body is assembled. Specifically, the support shoulder 38 may be recessed from the connecting wall 37 of the inboard panel 21 toward the inner peripheral wall 32, and the support shoulder 38 may extend in an inclined direction and/or a horizontal direction.

Figure 5:
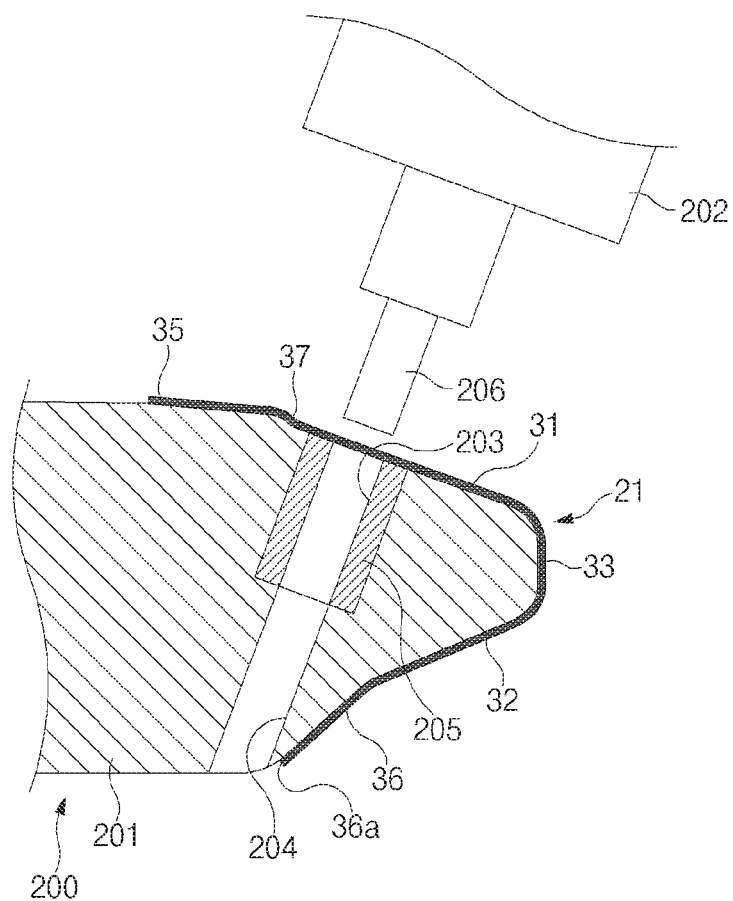
FIG. 5 illustrates a process of machining a mounting hole in a door frame according to an exemplary embodiment of the present disclosure by cam piercing using a press die.

Referring to FIG. 5, the door frame 2 according to an exemplary embodiment of the present disclosure may allow precise and easy machining of the mounting hole 100 in the outer peripheral wall 31 through a cam piercing process using the press die 200 as the outer peripheral wall 31 of the inboard panel 21 is inclined.

The press die 200 may include a fixed die 201 supporting the inboard panel 21 of the door frame 2, and a movable die 202 moving relative to the fixed die 201. The fixed die 201 may have the support bushing 205 supporting the bottom surface of the outer peripheral wall 31, and the support bushing 205 may be mounted in the fixed die 201 to correspond to the mounting hole 100 of the outer peripheral wall 31. The support bushing 205 may have a first bore 203 corresponding to a diameter of the mounting hole 100, and the fixed die 201 may have a second bore 204 aligned with the first bore 203. A diameter of the first bore 203 may be the same as a diameter of the second bore 204. The movable die 202 may have a piercing punch 206, and the piercing punch 206 may have a diameter corresponding to the diameter of the mounting hole 100. The piercing punch 206 may be aligned with the first bore 203 of the support bushing 205. When the movable die 202 moves to the fixed die 201, the piercing punch 206 may pass through the inboard panel 21 and the support bushing 205 may be inserted into the first bore 203, and thus the mounting hole 100 may be pierced in the inboard panel 21. After the piercing of the mounting hole 100, a chip removed from the inboard panel 21 may be discharged through the first bore 203 and the second bore 204.

Since the mounting hole 100 for mounting the door weatherstrip 11 is formed in the inboard panel 21 of the door frame 2 through the cam piercing process using the press die 200, a separate laser piercing apparatus may not be required unlike the related art. Thus, the equipment investment cost may be relatively reduced, and man-hours may be reduced, and accordingly the manufacturing cost may be reduced.

A process of manufacturing the inboard panel 21 of the door frame 2 will be detailed. The fixed die 201 may be used in one press equipment. In a state in which a material of the inboard panel 21 is supported on the fixed die 201, a forming die may press the material with respect to the fixed die 201, so that the outer peripheral wall 31, the inner peripheral wall 32, the inboard side wall 33, the first flange 35 and the second flange 36 of the inboard panel 21 may be formed. After the shape of the inboard panel 21 is made, the movable die 202 may move toward the fixed die 201 in a state in which the inboard panel 21 is remained in the fixed die 201, and the mounting hole 100 may be pierced in the inboard panel 21 by cooperation of the piercing punch 206 and the support bushing 205.

Since the inboard panel 21 which has been formed by the forming die is not moved to external equipment (the laser piercing apparatus or the like), and remains in the fixed die 201 without changing its position, the position of the mounting hole 100 in the inboard panel 21 may be accurately aligned with the support bushing 205. Thus, the mounting hole 100 may be pierced in a desired position and with a desired dimension according to a predetermined design by the cooperation of the piercing punch 206 and the support bushing 205, and the quality of the mounting hole 100 may be reliably obtained.

As set forth above, according to exemplary embodiments of the present disclosure, the mounting hole may be easily machined in the outer peripheral wall of the inboard panel by cam piercing using the press die as the outer peripheral wall of the inboard panel is inclined. Thus, the machining of the hole for mounting the door weatherstrip may be performed precisely and easily with relatively low cost.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A door frame for a vehicle, the door frame comprising:
an inboard panel including an outer peripheral wall, an inner peripheral wall spaced apart from the outer peripheral wall, and an inboard side wall connecting the outer peripheral wall and the inner peripheral wall, wherein the outer peripheral wall extends obliquely from the inboard side wall at a predetermined angle, and wherein the outer peripheral wall has a mounting hole configured to mount a door weatherstrip; and an outboard panel coupled to the inboard panel, wherein the inboard panel further includes a first flange extending from the outer peripheral wall, a connecting wall connecting the outer peripheral wall and the first flange, and a support shoulder arranged on the connecting wall, and wherein the support shoulder is recessed from the connecting wall toward the inner peripheral wall.

2. The door frame according to claim 1, wherein the outer peripheral wall is inclined with respect to the inboard side wall at a first inclined angle, the first inclined angle being acute.

3. The door frame according to claim 1, wherein the inner peripheral wall is inclined with respect to the inboard side wall at a second inclined angle, the second inclined angle being acute.

4. The door frame according to claim 1, wherein the inboard panel has a second flange extending from the inner peripheral wall.

5. The door frame according to claim 4, wherein the outboard panel has a third flange coupled to the first flange and a fourth flange coupled to the second flange.

6. The door frame according to claim 5, wherein an extension line virtually extends from an edge of the mounting hole to be parallel to an axis of the mounting hole and does not interfere with an end of the second flange of the inboard panel.

7. The door frame according to claim 1, wherein the door frame is integrally connected to a door panel of a vehicle door so that the door frame and the door panel form a unitary one-piece structure.

8. The door frame according to claim 7, wherein the door weatherstrip continuously extends along the outer peripheral wall of the inboard panel and edges of the door panel.

* * * * *